(12) United States Patent
Wang et al.

(10) Patent No.: US 12,186,897 B2
(45) Date of Patent: Jan. 7, 2025

(54) ACTUATOR AND ROBOT WITH RELIABLE TORQUE SENSOR ARRANGEMENT

(71) Applicant: Flexiv Ltd., Santa Clara, CA (US)

(72) Inventors: Shiquan Wang, Foster City, CA (US); Ran An, San Jose, CA (US)

(73) Assignee: FLEXIV LTD., Grand Cayman (KY)

( * ) Notice: Subject to any disclaimer, the term of this patent is extended or adjusted under 35 U.S.C. 154(b) by 1147 days.

(21) Appl. No.: 16/545,833

(22) Filed: Aug. 20, 2019

(65) Prior Publication Data

US 2020/0108514 A1 Apr. 9, 2020

Related U.S. Application Data

(60) Provisional application No. 62/743,303, filed on Oct. 9, 2018.

(51) Int. Cl.
| | |
|---|---|
| *B25J 19/00* | (2006.01) |
| *B25J 9/10* | (2006.01) |
| *B25J 9/12* | (2006.01) |
| *B25J 17/00* | (2006.01) |
| *B25J 19/02* | (2006.01) |
| *G01L 3/02* | (2006.01) |

(52) U.S. Cl.
CPC ............. *B25J 19/02* (2013.01); *B25J 9/1025* (2013.01); *B25J 9/126* (2013.01); *B25J 17/00* (2013.01); *B25J 19/0025* (2013.01); *G01L 3/02* (2013.01)

(58) Field of Classification Search
CPC .......... B25J 19/02; B25J 9/1025; B25J 9/126; B25J 17/00; B25J 19/0025; G01L 3/02
See application file for complete search history.

(56) References Cited

U.S. PATENT DOCUMENTS

| | | | | |
|---|---|---|---|---|
| 4,678,952 | A * | 7/1987 | Peterson | ............. B25J 19/0029 901/29 |
| 11,264,865 | B2 * | 3/2022 | Miyazawa | ............... B25J 9/126 |
| 2018/0172080 | A1* | 6/2018 | Jackowski | ............. F16H 35/10 |
| 2020/0086479 | A1* | 3/2020 | Messier | ................ H05K 1/189 |

\* cited by examiner

*Primary Examiner* — Zakaria Elahmadi
(74) *Attorney, Agent, or Firm* — K&L Gates LLP

(57) ABSTRACT

An actuator of a robotic system and a robot are provided. The actuator may include a center shaft, an outer shell connected to the center shaft, an input flange, and an output flange coaxially installed on the center shaft, a torque sensor and a motor assembly. The input flange and the output flange are radially fixed with at least one of the outer shell and the center shaft through a plurality of bearings. The torque sensor is connected between the input flange and the output flange, and configured to measure a torque transmitted by the input flange and the output flange. The motor assembly is coupled to the input flange. Disturbances transmitted from either side of the torque sensor may be isolated from the torque sensor. Therefore, the reliability of the readings of the torque sensor may be improved.

15 Claims, 7 Drawing Sheets

ACTUATOR AND ROBOT WITH RELIABLE TORQUE SENSOR ARRANGEMENT

CROSS-REFERENCE TO RELATED APPLICATIONS

The present application claims the benefit of priority under 35 U.S.C § 119(e) to U.S. Provisional Patent Application Ser. No. 62/743,303, entitled "HIGH-COMPACTNESS SHAFT-DATUM ROTARY ACTUATING SYSTEM WITH HIGH-FIDELITY TORQUE SENSING" and filed on Oct. 9, 2018, the disclosures of which are herein incorporated by reference in their entirety.

TECHNICAL FIELD

The present disclosure generally relates to robotic technology, and in particular to an actuator and a robot with a reliable torque sensor arrangement.

BACKGROUND

Torque sensors are generally used in robotics for a wide variety of tasks, and are important components for torque control of a robotic arm. In a torque-controlled robotic arm, each joint (e.g., actuating system/actuator) of the robotic arm may include a torque sensor for measuring the output torque for use in a closed-loop control system. However, integrating a sensitive torque sensor into a robotic joint presents many challenges. For example, to minimize errors created by sensor crosstalk, the torque sensor generally needs to be decoupled from forces and moments that are not in the sensing direction. Further, conventional joint actuating systems may use an outer shell as the only datum for the components, which can lead to complex and bulky mechanical designs for associated torque sensors.

SUMMARY

Accordingly, the present disclosure aims to provide an actuator and a robot with a reliable torque sensor arrangement, which may improve the reliability of torque sensor readings included in the actuator.

To solve the above-mentioned problem, the present disclosure adopts a technical scheme to provide an actuator of a robotic system. The actuator may include a center shaft, an outer shell connected to the center shaft, an input flange and an output flange coaxially installed on the center shaft, a torque sensor, and a motor assembly. The input flange and the output flange are radially fixed with at least one of the outer shell and the center shaft through a plurality of bearings. The torque sensor is connected between the input flange and the output flange, and configured to measure a torque transmitted by the input flange and the output flange. The motor assembly is coupled to the input flange.

To solve the above-mentioned problem, the present disclosure adopts a technical scheme to provide a robot with a plurality of actuators and a plurality of links. The links are connected successively by the actuators. Each actuator may include a center shaft, an outer shell connected to the center shaft, an input flange and an output flange coaxially installed on the center shaft, a torque sensor, and a motor assembly. The input flange and the output flange are radially fixed with at least one of the outer shell and the center shaft through a plurality of bearings. The torque sensor is connected between the input flange and the output flange, and configured to measure a torque transmitted by the input flange and the output flange. The motor assembly is coupled to the input flange.

To solve the above-mentioned problem, the present disclosure adopts a technical scheme to provide an actuator of a robotic system. The actuator may include a center shaft, an outer shell, a motor, a harmonic drive, an input flange, an output flange and a torque sensor. The outer shell may be connected to the center shaft. The motor, the harmonic drive, the input flange and the output flange may be coaxially installed on the center shaft through a plurality of bearings. The motor may be coupled to the harmonic drive, and an output end of the harmonic drive may be coupled to the input flange. The torque sensor may be connected between the input flange and the output flange, and may be configured to measure a torque transmitted by the input flange and the output flange.

According to some embodiments of the present disclosure, the input flange and the output flange may be radially fixed with the outer shell and/or the center shaft, and the torque sensor may be connected between the input flange and the output flange. Disturbances transmitted from either side of the torque sensor may therefore be isolated from the torque sensor. Accordingly, the reliability of the readings of the torque sensor may be improved.

BRIEF DESCRIPTION OF THE DRAWINGS

In order to clearly explain the technical solutions in the embodiments of the present disclosure, the drawings used in the description of the embodiments will be briefly described below. The drawings in the following description are merely exemplary embodiments of the present disclosure. For those of ordinary skill in the art, other embodiments may also be derived based on these drawings without any creative work.

DETAILED DESCRIPTION

The disclosure will now be described in detail with reference to the accompanying drawings and examples. The described embodiments are merely exemplary and represent a subset of the embodiments of the present disclosure. One skilled in the art may recognize additional embodiments based on the embodiments of the present disclosure without creative efforts and all such embodiments fall within the scope of the present disclosure.

Figure 1:
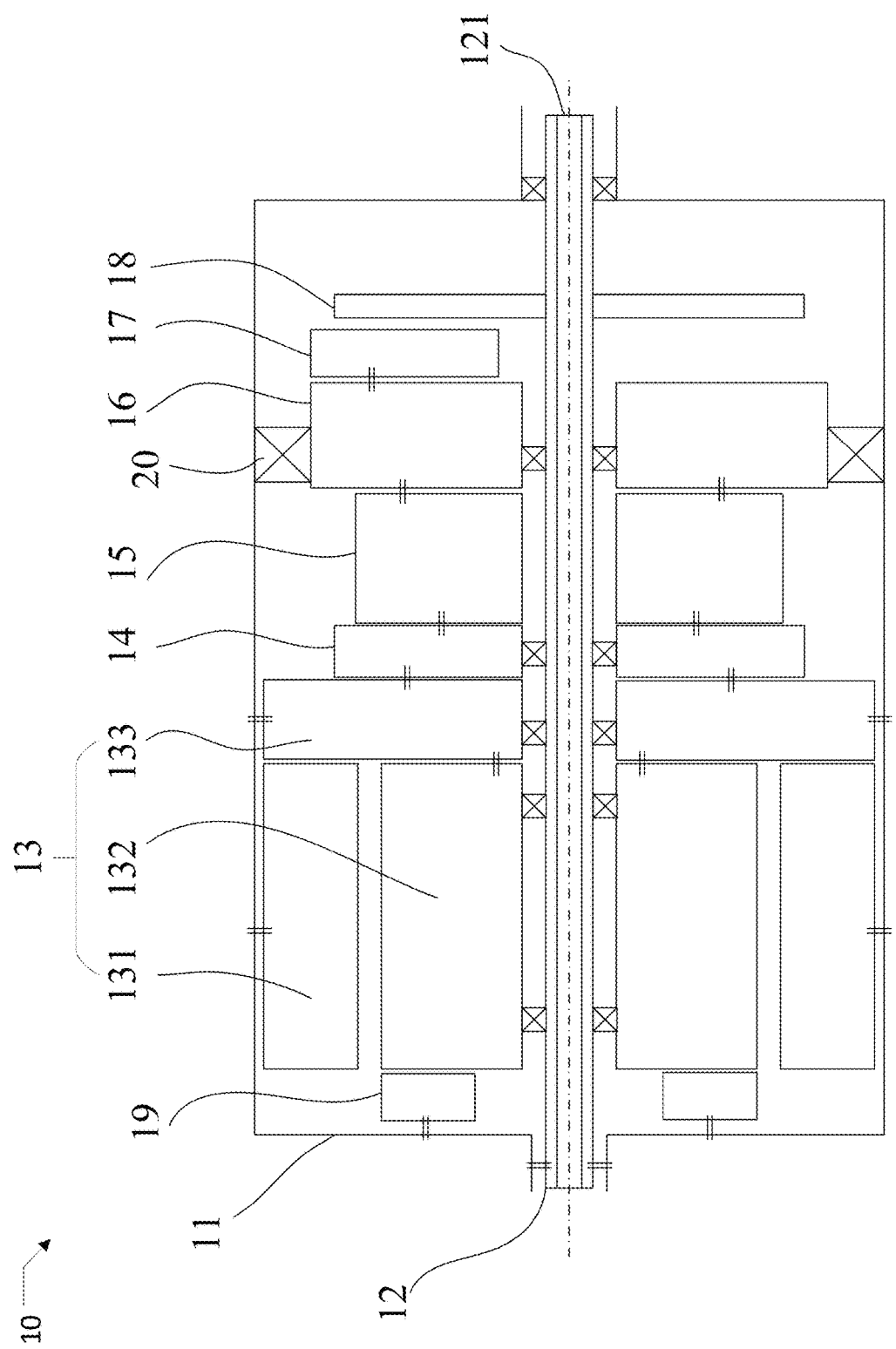
FIG. 1 is a schematic diagram illustrating the inner structure of an actuator, according to an embodiment of the present disclosure.

FIG. 1 depicts an example inner structure of an actuator 10, according to an embodiment of the present disclosure. The actuator 10 shown in FIG. 1 may include an outer shell 11, a center shaft 12, a motor assembly 13, an input flange 14, a torque sensor 15 and an output flange 16.

The outer shell 11 may be connected to the center shaft 12. For example, the center shaft 12 may be bolted to the outer shell 11 on the left end and may be guided by two bearings on the right end. In this example, the outer shell 11 and the center shaft 12 may use each other as a datum. The other components may use the outer shell 11, the center shaft 12 or both as the datum for alignment. In some aspects of the present disclosure, the center shaft 12 may be hollow to allow wires to pass through. For example, the center shaft 12 may define a center tunnel 121 which may accommodate control cables (not shown) of the actuator. The input flange 14 and the output flange 16 may be coaxially installed on (directly or indirectly) the center shaft 12. Bearings 20 may be used to align the input flange 14 and the output flange 16 concentrically with the center shaft 12 while still permitting relative rotary motion.

Figure 2:
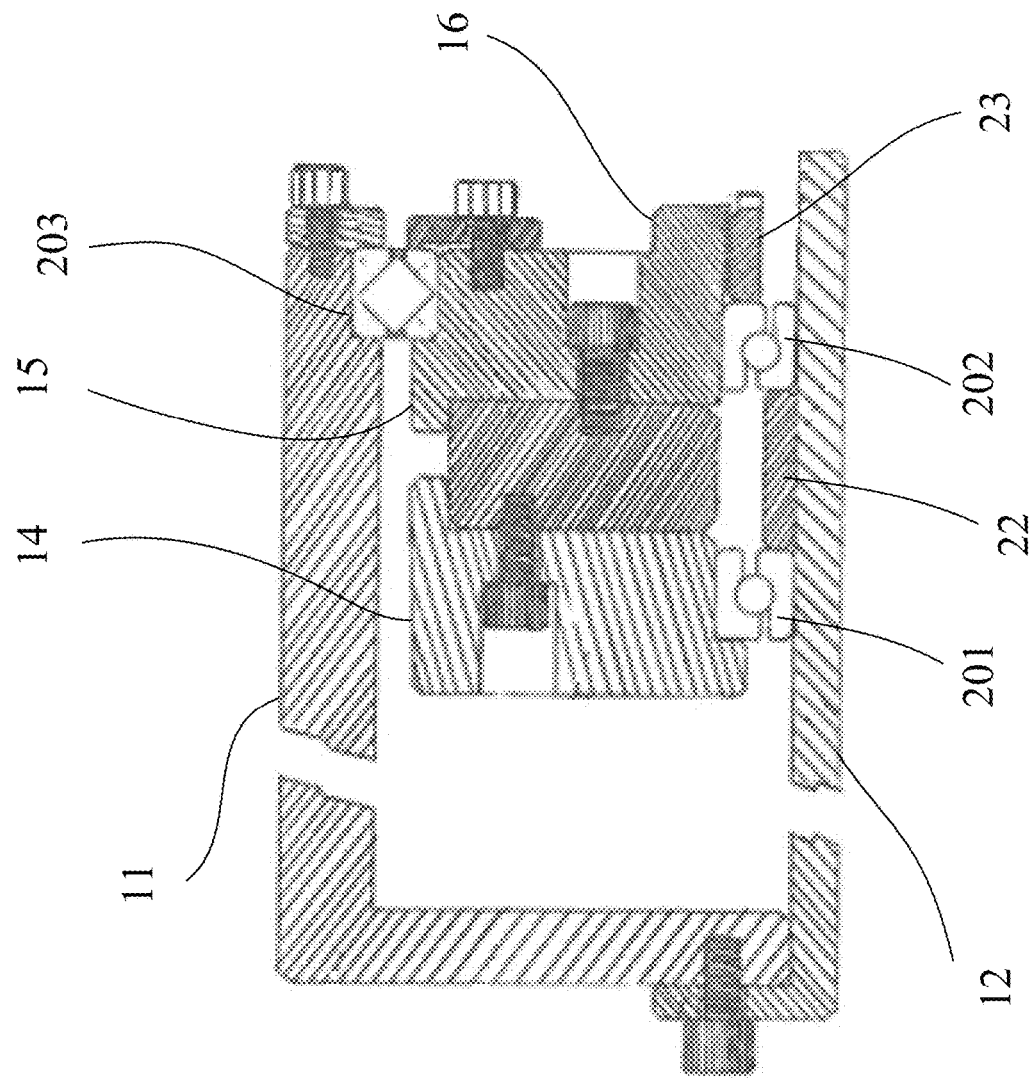
FIG. 2 shows an exemplary torque sensor arrangement of an actuator, according to an embodiment of the present disclosure.

In one embodiment, the bearings 20 may include a first bearing 201, a second bearing 202 and a third bearing 203, as shown in FIG. 2. The first bearing 201 may be connected between the input flange 14 and the center shaft 12. The second bearing 202 may be connected between the output flange 16 and the center shaft 12. The third bearing 203 may be connected between the output flange 16 and the outer shell 11.

Figure 3:
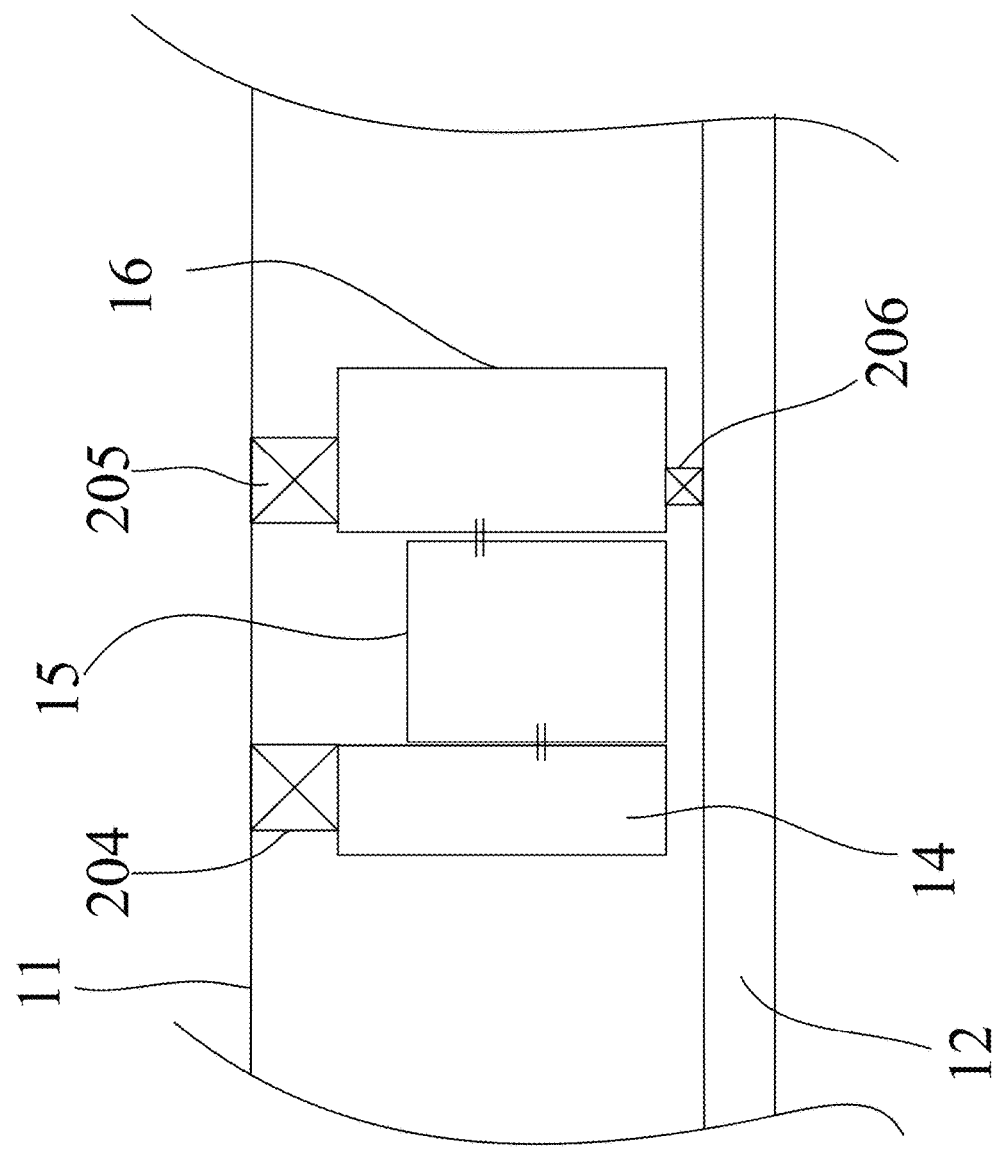
FIG. 3 shows an exemplary torque sensor arrangement of an actuator, according to an embodiment of the present disclosure.

In other embodiments, the bearings 20 may include a first bearing 204, a second bearing 205 and a third bearing 206, as shown in FIG. 3. The first bearing 204 may be connected between the input flange 14 and the outer shell 11. The second bearing 205 may be connected between the output flange 16 and the outer shell 11. The third bearing 206 may be connected between the output flange 16 and the center shaft 12. In other examples of the present disclosure, the bearings 20 may be arranged differently such that the input flange 14 and the output flange 16 may be properly connected to the outer shell 11, the center shaft 12, or both.

Figure 4:
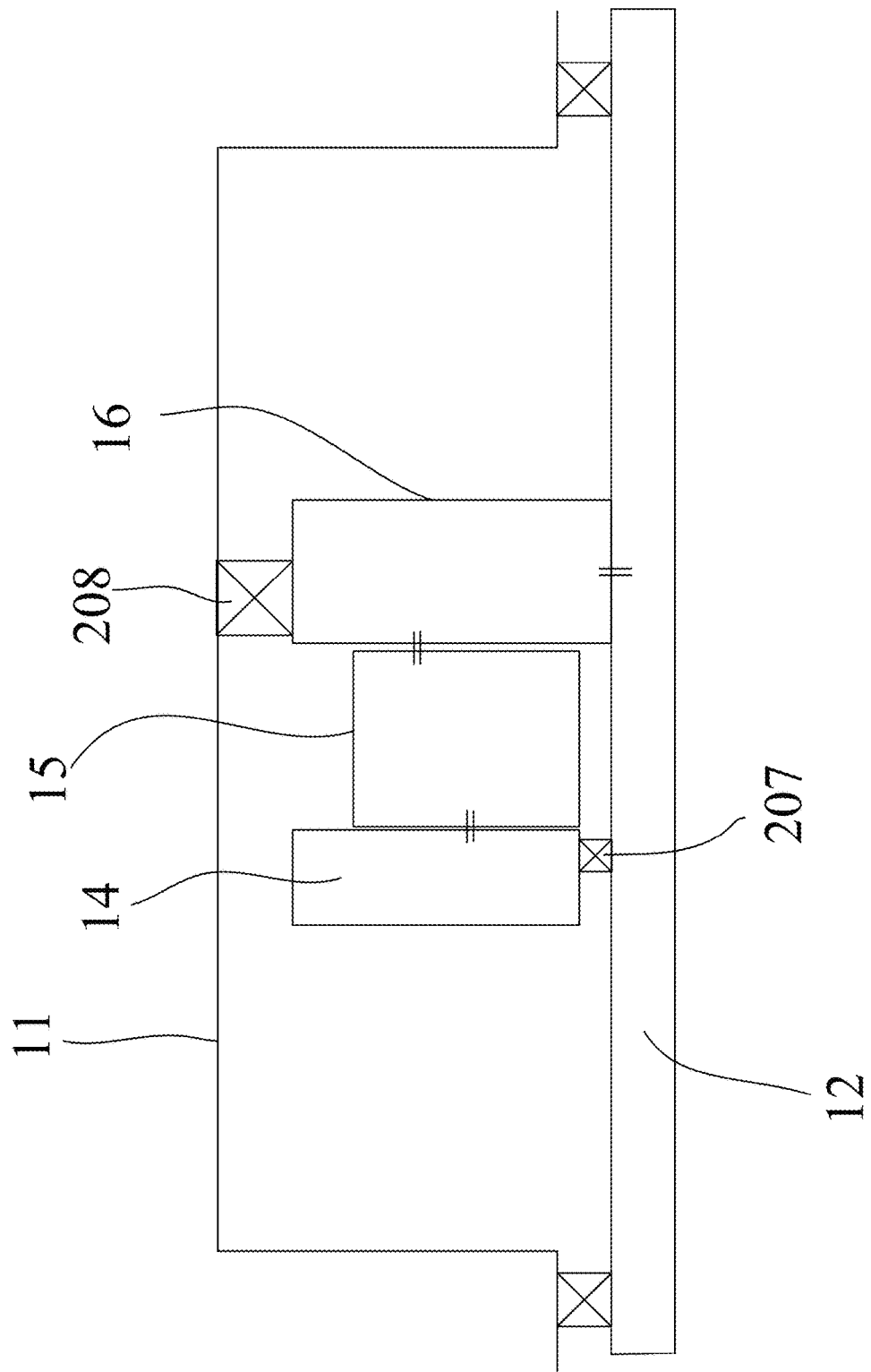
FIG. 4 shows an exemplary torque sensor arrangement of an actuator, according to an embodiment of the present disclosure.

For example, in the embodiment illustrated in FIG. 4, the center shaft 12 may be rotatably connected to the outer shell 11 and the output flange 16 may be fixed to the center shaft 12 such that the output flange 16 and the center shaft 12 may rotate together with respect to the outer shell 11. In this example, the bearings 20 may only include a first bearing 207 located between the input flange 14 and the center shaft 12 and a second bearing 208 located between the output flange 16 and the outer shell 11. In certain aspects of the present disclosure, the bearings 20 may be angular contact bearings. In other aspects, the bearings 20 may have sufficient axial load ratings, such as deep groove ball bearings.

Referring to FIGS. 1-4, in some aspects, the torque sensor 15 may be connected between the input flange 14 and the output flange 16. The torque sensor 15 may be utilized to measure the torque transmitted by the input flange 14 and the output flange 16. The torque sensor 15 may be any suitable torque sensor well known in the art. For example, the torque sensor 15 may include two rigid plates (not shown) respectively connected to the input flange 14 and the output flange 16, and the two rigid plates may be connected by elastic components. One or more signal pairs may be installed on the two rigid plates. In this example, the torque transmitted may be a result of the deformation of the elastic components (i.e., the displacement between the two rigid plates) and be estimated based on readings of the signal pairs.

In the preceding embodiment, the input flange 14 and the output flange 16 are radially fixed with the outer shell 11 and/or the center shaft 12, and the torque sensor 15 is connected between the input flange 14 and the output flange 16. Accordingly, disturbances transmitted from either side of the torque sensor 15 may be isolated from the torque sensor 15 by the input flange 14, the output flange 16, and the bearings 20. Therefore, the reliability of the torque sensor 15 readings may be improved.

In some examples, the bearings 20 may also be used to resist axial disturbances created by other internal components. When the joint with the actuator 10 is loaded from different directions, the center shaft 12 and the outer shell 11 may accordingly provide rigid protection such that (1) the torque sensor 15 only measures the axial torque and (2) loads from other directions do not penetrate through the rigid shaft-datum structure. Additionally, vibration or other disturbances generated by any of the actuator 10 components, for example the motor assembly 13, do not affect the other components of the joint with the actuator 10 because the center shaft 12 and the outer shell 11 provide strong support against vibration from propagation. For example, vibrations may be dampened by the stiffness of the center shaft 12. Accordingly, the torque sensor 15 is configured to take high fidelity readings that reflect the actual axial torque applied to the robotic arm at the actuator 10.

Referring to FIG. 2, the actuator 10 may further include a shaft sleeve 22. The shaft sleeve 22 may be disposed around the center shaft 12, and between the first bearing 201 and the second bearing 202, so as to keep a pre-determined distance between the first bearing 201 and the second bearings 202. In such examples, the distance between the first bearing 201 and the second bearing 202 may be changed by adjusting the size of the shaft sleeve 22.

In various examples, the actuator 10 may further include a limiting nut 23. As shown in FIG. 2, the limiting nut 23 may be connected to the output flange 16 with a threaded connection. Thus, the axial position of the limiting nut 23 may be adjusted when being rotated. The limiting nut 23 may be utilized to limit the axial position of the first bearing 201 and the second bearing 202 with respect to the center shaft 12. In other embodiments, the limiting nut 23 may alternatively be connected to the input flange 14 with a threaded connection and be utilized to similarly limit the axial position of bearings 20. In some examples, protrusions may be formed on the outer shell 11, the center shaft 12, the input flange 14 and/or the output flange 15 for limiting the axial position of the bearings 201, 202 and 203.

Figure 5:
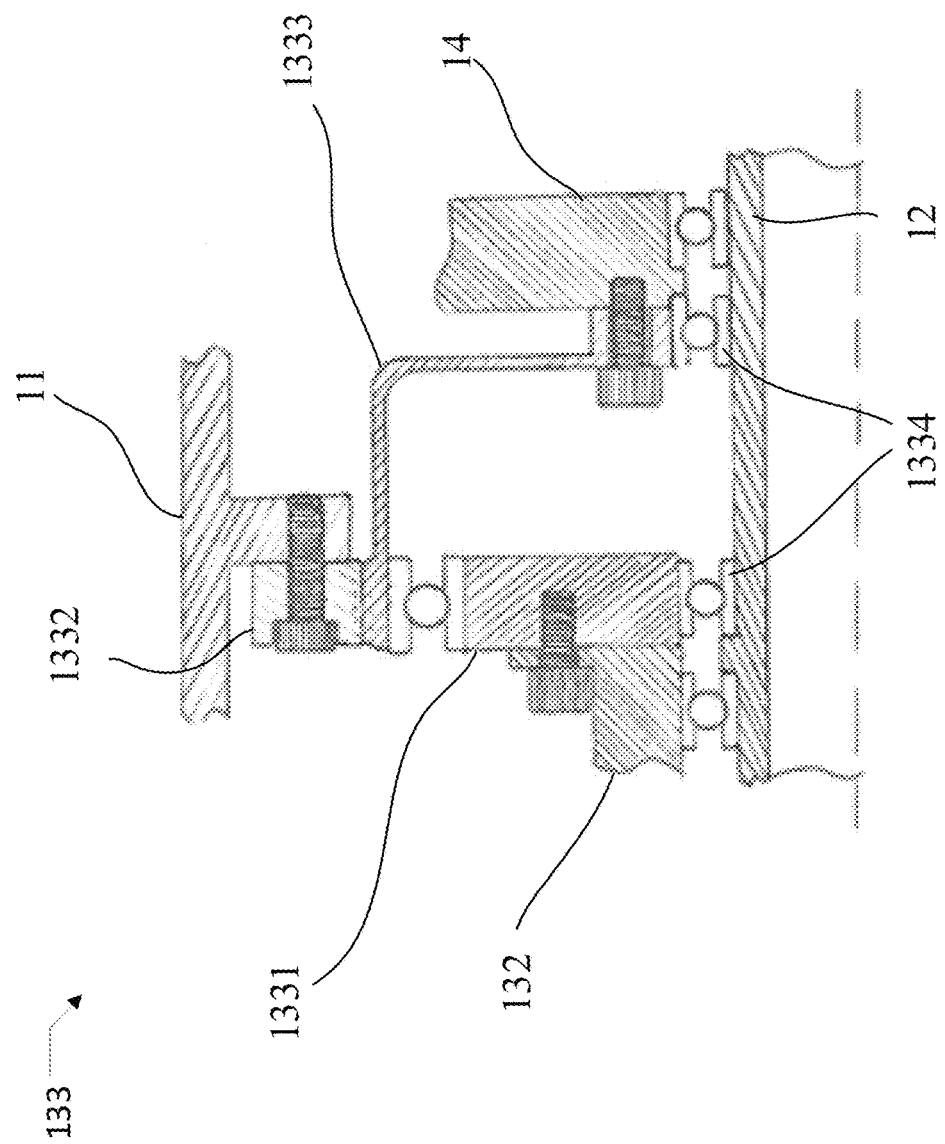
FIG. 5 illustrates an exemplary structure of a harmonic drive of an actuator, according to an embodiment of the present disclosure.

Referring to FIGS. 1 and 5, the motor assembly 13 of the example actuator 10 may include a motor (not illustrated) and a harmonic drive 133. The harmonic drive 133 may be coupled between the motor and the input flange 14. The motor may include a motor stator 131 and a motor rotor 132. The motor stator 131 may be installed on the outer shell 11 while the motor rotor 132 may be rotatably connected to the center shaft 12 through a motor bearing (not labeled). The harmonic drive 133 may include a wave generator 1331, a circular spline 1332 and a flexspline 1333. The wave generator 1331 may be coupled with an output end of the motor rotor 132. The circular spline 1332 may be fixed with the outer shell 11. The flexspline 1333 may be coupled with the input flange 14.

In some examples, both the wave generator 1331 and the flexspline 1333 may be rotatably connected to the center shaft 12 through multiple harmonic drive bearings 1334. In these examples, the harmonic drive 133 may be aligned concentrically with very tight tolerances to prevent torque ripple and to improve durability of the harmonic drive 133. As illustrated in FIG. 5, the example harmonic drive 133 uses both the outer shell 11 and a pair of bearings 1334 aligned with the center shaft 12 as a datum to fulfill the alignment requirement. In the example design, the datum locations of the wave generator 1331 and the flexspline 1333 may be very close along the center shaft 12, which avoids tolerances stacking up over multiple parts, and helps ensure compliance with the tight tolerances of the harmonic drive 133.

Figure 6:
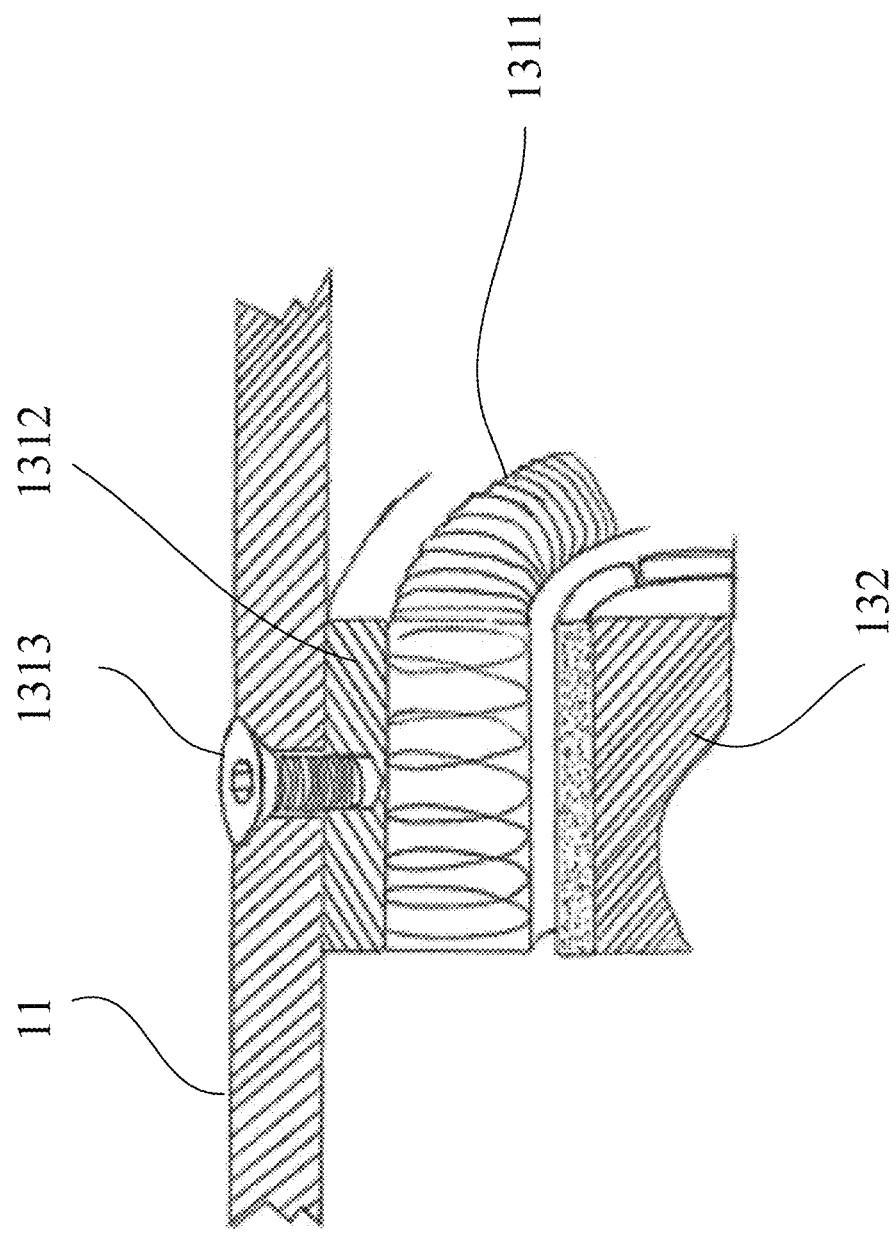
FIG. 6 illustrates an exemplary structure of a motor of an actuator, according to an embodiment of the present disclosure.

In some aspects of the present disclosure, frameless motors may be used in the actuators 10 to meet the compactness and high torque density requirements of the actuators 10. Such motors may include a motor stator 131 and a motor rotor 132 that require proper housing to ensure concentricity. As shown in FIG. 6, the motor stator 131 may include a coil 1311 and an annular fixture 1312 assembled together. The annular fixture 1312 may fit the inner surface of the outer shell 11. Specifically, in some examples, the annular fixture 1312 may have an outer diameter substantially equal to the inner diameter of the outer shell 11, and the annular fixture 1312 may slide into the outer shell 11 during installation.

In some examples, a radial screw 1313 may fix the annular fixture 1312 on the outer shell 11. In these examples, the motor stator 1312 may be more easily installed onto the outer shell 11. Such an assembly configuration may also eliminate the need to replace the entire outer shell 11 when mistakes happen while bonding the motor stator 1312, unlike adhesive-based solutions.

In some examples, the actuator 10 may further include other components. For example, a brake 19 may be mounted on the center shaft 12 or the outer shell 11 for stopping the rotation of the motor assembly 13. An encoder reader 17 may be connected to the output flange 16 while a corresponding encoder disk 18 may be connected to the center shaft 12.

Figure 7:
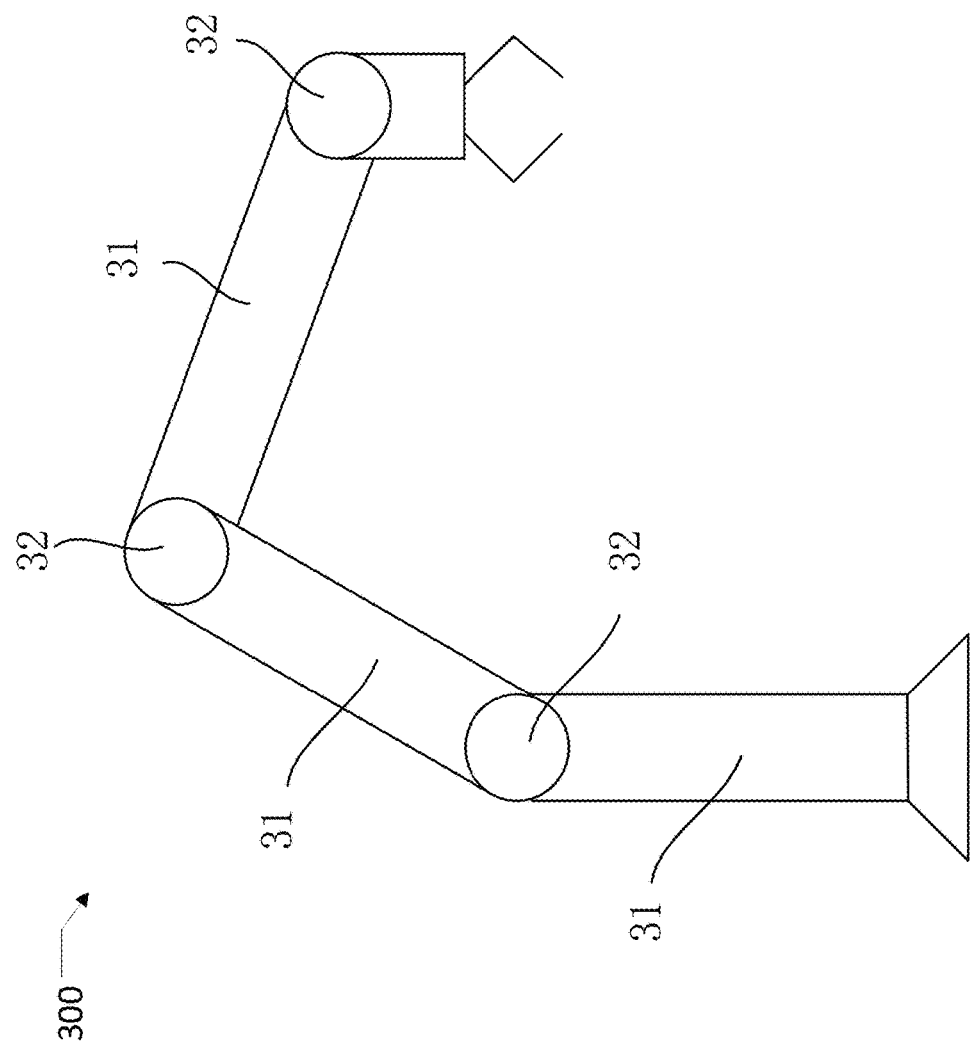
FIG. 7 is a schematic diagram of a robot, according to an embodiment of the present disclosure.

FIG. 7 illustrates an example robot 300 of the present disclosure, which, for example, may be an industrial robot. The example robot 300 may include multiple actuators 32 and multiple links 31. The links 31 may be connected successively by the actuators 32. At least some of the actuators may have a similar structure as any one of the embodiments described above. In some embodiments, the robot 300 may include more components or less components than illustrated in FIG. 7. For example, some components may be combined or different types of components may be employed. For example, the robot 300 may further include an I/O device, a network accessing device, a communication bus, a processor, a memory, sensors etc. In some aspects of the present disclosure, a processor of the robot 300 may acquire the torque detected by the torque sensor of each actuator 32 so as to achieve a close-loop torque control.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An actuator of a robotic system, comprising:
a center shaft;
an outer shell connected to the center shaft;
an input flange and an output flange coaxially installed on the center shaft, wherein the input flange and the output flange are radially fixed with at least one of the outer shell and the center shaft through a plurality of bearings;
a torque sensor connected between the input flange and the output flange, and configured to measure a torque transmitted by the input flange and the output flange, wherein the torque sensor is in contact with the input flange and the output flange; and
a motor assembly coupled to the input flange, wherein the input flange is a separate component from the motor assembly,
wherein the plurality of bearings comprise:
a first bearing connected between the input flange and the outer shell;
a second bearing connected between the output flange and the outer shell; and
a third bearing connected between the output flange and the center shaft.

2. An actuator of a robotic system, comprising:
a center shaft;
an outer shell connected to the center shaft;
an input flange and an output flange coaxially installed on the center shaft, wherein the input flange and the output flange are radially fixed with at least one of the outer shell and the center shaft through a plurality of bearings;
a torque sensor connected between the input flange and the output flange, and configured to measure a torque transmitted by the input flange and the output flange, wherein the torque sensor is in contact with the input flange and the output flange; and
a motor assembly coupled to the input flange, wherein the input flange is a separate component from the motor assembly,
wherein the plurality of bearings comprise:
a first bearing connected between the input flange and the center shaft;
a second bearing connected between the output flange and the center shaft; and
a third bearing connected between the output flange and the outer shell.

3. The actuator of claim 2, further comprising:
a shaft sleeve disposed around the center shaft and between the first bearing and the second bearing so as to keep a pre-determined distance between the first bearing and the second bearing.

4. The actuator of claim 3, further comprising:
a limiting nut connected to the input flange or the output flange with a threaded connection, wherein the limiting nut is configured to limit an axial position of the first bearing and the second bearing.

5. The actuator of claim 1, wherein
the motor assembly comprises a motor and a harmonic drive, wherein the harmonic drive is coupled between the motor and the input flange, and
the motor comprises
a motor stator installed on the outer shell; and
a motor rotor rotatably connected to the center shaft through a motor bearing.

6. The actuator of claim 5, wherein the harmonic drive comprises:
a wave generator coupled with an output end of the motor rotor;
a circular spline fixed with the outer shell; and
a flexspline coupled with the input flange, wherein the wave generator and the flexspline are rotatably connected to the center shaft through multiple harmonic drive bearings.

7. The actuator of claim 5, wherein
the motor stator comprises a coil and an annular fixture, wherein the coil and the annular fixture are assembled together, and
the annular fixture fits an inner surface of the outer shell and is connected to the outer shell with a radial screw.

8. The actuator of claim 1, wherein
the center shaft defines a center tunnel passing through the center shaft for accommodating control cables of the actuator.

9. A robot with a plurality of actuators and a plurality of links, wherein the plurality of links are connected successively by the plurality of actuators, and each of the plurality of actuators comprises:
a center shaft;
an outer shell connected to the center shaft;
an input flange and an output flange coaxially installed on the center shaft, wherein the input flange and the output flange are radially fixed with at least one of the outer shell and the center shaft through a plurality of bearings;
a torque sensor connected between the input flange and the output flange, and configured to measure a torque transmitted by the input flange and the output flange, wherein the torque sensor is in contact with the input flange and the output flange; and
a motor assembly coupled to the input flange, wherein the input flange is a separate component from the motor assembly,
wherein the plurality of bearings comprise:
a first bearing connected between the input flange and the center shaft;
a second bearing connected between the output flange and the center shaft; and
a third bearing connected between the output flange and the outer shell.

10. The robot of claim 9, further comprising:
a shaft sleeve disposed around the center shaft and between the first bearing and the second bearing so as to keep a pre-determined distance between the first bearing and the second bearing.

11. The robot of claim 10, further comprising:
a limiting nut connected to the input flange or the output flange with a threaded connection, wherein the limiting nut is configured to limit an axial position of the first bearing and the second bearing.

12. The robot of claim 9, wherein the motor assembly comprises a motor and a harmonic drive, wherein the harmonic drive is coupled between the motor and the input flange, and
the motor comprises
a motor stator installed on the outer shell; and
a motor rotor rotatably connected to the center shaft through a motor bearing.

13. The robot of claim 12, wherein the harmonic drive comprises:
a wave generator coupled with an output end of the motor rotor;
a circular spline fixed with the outer shell; and
a flexspline coupled with the input flange,
wherein the wave generator and the flexspline are rotatably connected to the center shaft through multiple harmonic drive bearings.

14. The robot of claim 12, wherein
the motor stator comprises a coil and an annular fixture, wherein the coil and the annular fixture are assembled together, and
the annular fixture fits an inner surface of the outer shell and is connected to the outer shell with a radial screw.

15. The robot of claim 9, wherein
the center shaft defines a center tunnel passing through the center shaft for accommodating control cables of the robot.

* * * * *